United States Patent [19]

von Bonin et al.

[11] 4,058,492

[45] Nov. 15, 1977

[54] PROCESS FOR MOLDING POLYURETHANE FOAMS

[75] Inventors: Wulf von Bonin; Helmut Kleimann, both of Leverkusen; Udo Post, Bergisch-Gladbach (Paffrath), all of Germany

[73] Assignee: Bayer Aktiengesellschaft, Leverkusen, Germany

[21] Appl. No.: 697,589

[22] Filed: June 18, 1976

Related U.S. Application Data

[63] Continuation of Ser. No. 521,427, Nov. 6, 1974, abandoned.

[30] Foreign Application Priority Data

Jan. 10, 1974 Germany ............................ 2404310

[51] Int. Cl.$^2$ ............................................. C08G 18/36
[52] U.S. Cl. ....................... 260/2.5 AM; 260/2.5 AZ; 260/2.5 AG; 264/300; 264/45.5; 264/DIG. 14

[58] Field of Search ................. 260/2.5 AG, 2.5 AZ, 260/2.5 AN, 2.5 AL, 2.5 AM; 264/300

[56] References Cited

U.S. PATENT DOCUMENTS

| 3,726,952 | 4/1973 | Boden ............................ 260/2.5 AZ |
| 3,925,527 | 12/1975 | Kleimann ...................... 260/2.5 AG |
| 3,931,381 | 1/1976 | Lindberg ....................... 260/2.5 AZ |
| 3,993,606 | 11/1976 | von Bonin ............................ 264/300 |
| B 506,144 | 2/1976 | Knipp ............................ 260/2.5 AZ |

FOREIGN PATENT DOCUMENTS 2,121,670 11/1972 Germany

*Primary Examiner*—C. Warren Ivy
*Attorney, Agent, or Firm*—Gene Harsh; Joseph C. Gil; William E. Parry

[57] ABSTRACT

The mold release properties of a molded polyurethane foam are improved by including in the foamable reaction mixture to be molded a reaction product of a ricinoleic acid and a long chain fatty acid.

6 Claims, No Drawings

PROCESS FOR MOLDING POLYURETHANE FOAMS

This is a continuation, of application Ser. No. 521,427, filed Nov. 6, 1974 and now abandoned.

This invention relates generally to the molding of foam plastics and more particularly to an improved mold release agent for foamable reaction mixtures which form polyurethane foams.

Polyurethane foams having a dense outer skin and a cellular core of the kind which can be obtained by foaming in a mold (German Auslegeschrift No. 1,196,864 and French Patent Specification No. 1,599,325) are particularly suitable for the series production of lightweight building constructions, for example of the kind used in the manufacture of furniture, cushioning parts for motor vehicles and in house building.

The molded polyurethane products are produced by introducing the foamable reaction mixture comprising an organic polyisocyanate, a compound which contains at least two hydrogen atoms that are reactive with isocyanates and additives into closed molds which can be heated. The reaction mixture foams up in the mold and solidifies into a highly compacted form. It substantially completely fills the mold and accurately reproduces the internal surfaces of the mold.

The molds are preferably made of a material with a high thermal capacity and conductivity, preferably metal, although other materials such as plastics, glass, wood, etc. may also be used.

In order to prevent adherence of the plastics to the surface of the mold on removal of the molded product, the mold is treated with a mold release agent. Substances currently used for this purpose include waxes, soaps or oils. These mold release agents form a thin film between the surface of the mold and the plastics. The film prevents the molded product from sticking to the mold so the product can be removed easily from the mold.

This method has various disadvantages for production of a series of products one after the other in the same mold. The mold release agent must be applied to the mold wall at regular intervals and during this time, the mold is not available for production. Fine engravings on the mold, e.g. a simulated wood structure on leather grain, become covered with residues of mold release agent in the course of time. Considerable effort is required to remove these firmly adhering residues from the molds which frequently have a highly structured surface. Furthermore, the molded product becomes covered with a thin film of mold release agent which prevents the adherence of lacquer or other coatings. The articles must therefore be buffed or cleaned with solvents before they are lacquered in order that the lacquer may adhere sufficiently firmly to the molded product.

It is already known from German Offenlegungsschrift No. 1,953,637 that the application of a mold release agent to the mold can be dispensed with if the foamable reaction mixture is mixed with certain additives which impart excellent mold release properties to the finished plastics product so that it can easily be removed from metal molds with its surfaces intact. Salts which contain at least 25 carbon atoms obtained from aliphatic carboxylic acids and amines, preferably primary amines or amines which contain amide or ester groups, have been disclosed as additives which have this effect.

In German Offenlegungsschrift No. 2,121,670, a process has been disclosed for the production of foam plastics by foaming a reaction mixture of polyisocyanates, compounds which contain reactive hydrogen atoms, water and/or organic blowing agents and additives in a closed mold, in which the additives used are, for example, a mixture of (a) salts of aliphatic carboxylic acids and amines which may contain amide and/or ester groups, which salts contain at least 20 aliphatic carbon atoms, and (b) natural and/or synthetic oils, fats or waxes.

Since these additives have an internal lubricating effect on the plastics mixture, they impart excellent flow properties to the plastics material in the mold and reduce the formation of bubbles on the surface of the plastics. Furthermore, these internal mold release agents have an antistatic effect and excellent mold release properties even in metal molds with a highly structured surface.

Although excellent mold release effects can be obtained by the known methods in rigid plastics, it is in practice frequently found that the esters of higher fatty acids or their mixed esters often used as synthetic oils or waxes are not sufficiently effective mold release agents for producing special elastomeric foam plastics.

The problem therefore arose of final internal mold release agents which would provide excellent mold release properties for the production of polyurethane foams having a cellular core and a dense outer skin which are elastomeric in character.

It is therefore an object of this invention to provide a process for molding foam plastics which is devoid of the foregoing disadvantages. Another object of the invention is to provide an improved process for molding polyurethane foams. Still another object of the invention is to provide an improved release agent for use in molding polyurethane foams. A further object of the invention is to provide an improved process for molding polyurethane foams having a dense skin and a cellular core. A still further object of the invention is to provide a foamable liquid composition adapted to react, expand and solidify in a mold to substantially fill the mold with a solid polyurethane foam which can be removed from the mold without undesirable sticking of the molded foam to the wall of the mold.

The foregoing objects and others are accomplished in accordance with this invention, generally speaking, by providing a foamable reaction mixture adapted to be molded and containing an organic polyisocyanate and as an internal mold release agent, a reaction product of ricinoleic acid and a long chain fatty acid. The invention also provides a process for molding the reaction mixture wherein the above foamable reaction mixture is charged to a suitable mold free from mold release agent on its inner walls, the mold is closed while the mixture reacts, expands and solidifies in the mold and the resulting molded product is easily removed from the mold.

It has now surprisingly been found that the reaction products of ricinoleic acid with long chain fatty acids alone or in combination with other mold release agents or systems provide excellent mold release effects in the production of foams by the method of foaming in the mold and, moreover, provide exceptionally good mold release properties in elastomeric foam plastics.

This invention therefore provides a process for the production of molded foam plastics which can easily be removed from the mold in which they have been foamed, the process comprising foaming a reaction mixture of an organic polyisocyanate, an organic compound having a molecular weight of about 62 to about 10,000 which contains relative hydrogen atoms, water and/or organic blowing agents and optionally other additives, characterized in that ester type reaction products of 0.8 to 4 mol of ricinoleic acid and 1 mol of long chain fatty acids are added as mold release agents.

The mold release effect may be determined subjectively by manually opening a suitable mold and removing the molded foam panel (20 × 20 × 1 cm). The mold release forces required for removing foam plastics which contain the reaction products according to the invention are considerably lower than those required for foams which are otherwise similar but which have been obtained by foaming the reaction mixture without these additives.

The foam plastics obtained by the process according to the invention are primarily polyurethane foams known per se which are produced by foaming in a mold, but the mold release agents which are an essential feature of the invention can be used equally advantageously when the process of foaming in the mold is applied to the production of other polyisocyanate based foams of the kind which can be obtained from polyisocyanates alone or with the addition of organic compounds which contain at least two Zerewitinoff active hydrogen atoms, e.g., polycarbondiimide, polyisocyanurate, polyurea, polybiuret or polyamide foams, mixed foams or other foams based on polyisocyanates.

Any suitable organic polyisocyanate may be used as a starting component according to the invention including aliphatic, cycloaliphatic, araliphatic, aromatic or heterocyclic polyisocyanates of the kind which have been described e.g. by W. Siefgen in Justus Liebigs Annalen der Chemie, 562, pages 75 to 136, for example ethylene diisocyanate; tetramethylene-1,4-diisocyanate; hexamethylene-1,6-diisocyanate; dodecane-1,12-diisocyanate; cyclobutane-1,3diisocyanate; cyclohexane-1,3-diisocyanate; cyclohexane-1,4-diisocyanate and any mixtures of these isomers; 1-isocyanato-3,3,5-trimethyl-5-isocyanatomethyl-cyclohexane (U.S. Pat. No. 3,401,190); hexahydrotolylene-2,4-diisocyanate, hexahydrotolylene-2,6-diisocyanate and any mixtures of these isomers; hexahydrophenylene-1,3-diisocyanate, hexahydrophenylene-1,4-diisocyanate; perhydro-2,4'-diphenylmethane-diisocyanate, perhydro-4,4'-diphenylmethane-diisocyanate; phenylene-1,3-diisocyanate; phenylene-1,4-diisocyanate; tolylene-2,4-diisocyanate; tolylene-2,6-diisocyanate and any mixtures of these isomers; diphenylmethane-2,4'-diisocyanate; diphenylmethane-4,4'-diisocyanate; naphthylene-1,5-diisocyanate; triphenylmethane-4,4',4''-triisocyanate; polyphenyl-polymethylene polyisocyanate which can be obtained by aniline-formaldehyde condensation followed by phosgenation and which have been described e.g. in British Patent Specification Nos. 874,430 and 848,671, perchlorinated arylpolyisocyanates as described e.g. in U.S. Pat. No. 3,277,138; polyisocyanates which contain carbodiimide groups as described in U.S. Pat. No. 3,152,162; the diisocyanates described in U.S. Pat. No. 3,492,330; polyisocyanates which contain allophanate groups as described e.g. in British Patent Specification No. 994,890; Belgian Patent Specification No. 761,626 and published Dutch Patent Application No. 7,102,524; polyisocyanates which contain isocyanurate groups as described e.g. in U.S. Pat. No. 3,001,973, in German Patent Specification Nos. 1,022,789; 1,222,067 and 1,027,394 and German Offenlegungsschriften Nos. 1,929,034 and 2,004,048; polyisocyanates which contain urethane groups as described e.g. in Belgian Patent Specification No. 752,261 or U.S. Pat. No. 3,394,164; polyisocyanates which contain acylated urea groups according to German Patent Specification No. 1,230,778; polyisocyanates which contain biuret groups as described e.g. in U.S. Pat. Nos. 3,124,605 and 3,201,372; British Patent Specification No. 889,050 and French Patent Specification No. 7,017,514; polyisocyanates prepared by telomerization reactions as described e.g. in U.S. Pat. No. 3,654,106; polyisocyanates which contain ester groups as described e.g. British Patent Specification No. 965,474 and 1,072,956; U.S. Pat. No. 3,567,763 and German Patent Specification No. 1,231,668 and reaction products of the above mentioned isocyanates with acetals according to German Patent Specification No. 1,072,385.

Among the preferred polyisocyanates are also polyisocyanates which contain isocyanurate groups which isocyanurate groups are formed in situ in the course of the process of the invention by using polyisocyanate mixtures with catalysts that accelerate the trimerization reaction of organic polyisocyanates. These catalysts are known in the art and include e.g. organic alkali salts such as for example potassium acetate, potassium propionate, sodium acetate, sodium propionate or Mannich bases such as disclosed in U.S. Pat. No. 3,580,890 or British Pat. No. 1,140,394 which are incorporated herein by reference. These catalysts are normally used in amounts as disclosed in the above patents.

The distillation residues which are obtained from the commercial production of isocyanates and which still contain isocyanate groups may also be used, optionally dissolved in one or more of the above mentioned polyisocyanates. Any mixtures of the above mentioned polyisocyanates may also be used.

It is generally preferred to use commercially readily available polyisocyanates such as tolylene-2,4-diisocyanate and tolylene-2,6-diisocyanate and any mixtures of these isomers ("TDI"); polyphenyl-polymethylene-polyisocyanates which are obtained by aniline-formaldehyde condensation followed by phosgenation ("crude MDI") and polyisocyanates which contain carbodiimide, urethane allophanate isocyanurate, urea of biuret groups ("modified polyisocyanates").

For preparing the semi-rigid elastic foams which are of particular interest in this invention, it is particularly preferred in the process according to the invention to use modified aromatic diisocyanates and, in particular, derivatives of diphenylmethane-4,4'-diisocyanate.

Examples of these particularly preferred polyisocyanates include 4,4'-diphenylmethane-diisocyanate which has been liquefield by partial carbodiimidization and the "liquefied" 4,4'-diphenylmethane-diisocyanate which can be obtained by reacting 1 mol of 4,4'-diphenylmethane-diisocyanate with approximately 0.1 to 0.3 mol of dipropylene glycol or a polypropylene glycol which has a molecular weight of not more than 700.

The starting components used according to the invention may also include organic compounds having a molecular weight of about 62 to about 10,000 which contain at least two hydrogen atoms determinable by the Zerewitinoff method and capable of reacting with isocyanates. These include not only the compounds which contain amino, thiol or carboxyl groups but particularly polyhydroxyl compounds, especially those which contain 2 to 8 hydroxyl groups, more particularly those with a molecular weight of about 200 to about 10,000, preferably about 1000 to about 6000, e.g. polyester, polyethers, polythioethers, polyacetals, polycarbonates and polyester amides which contain at least two, generally 2 to 8 but preferably 2 to 4 hydroxyl groups of the kind which are known per se for the production of both homogeneous and cellular polyurethanes. In the process according to the invention, it is often advantageous to use the above mentioned higher molecular weight polyhydroxyl compounds as a mixture with up to 95, preferably up to 50% by weight, based on the total quantity of polyhydroxyl compounds, of low molecular weight polyols with molecular weights of about 62 to about 200. Low molecular weight polyols of this kind include e.g. ethylene glycol; propane-1,2-diol; propane-1,3-diol; butane-1,2-diol; butane-1,4-diol; hexane-1,6-diol; decane-1,10-diol; diethylene glycol; triethylene glycol; tetraethylene glycol; dipropylene glycol; tripropylene glycol; glycerol; trimethylolpropane and the like. A foam made with a mixture of polyols of this type has a density of 20–1100 kg/m$^3$ and is elastomeric.

Any suitable polyester having hydroxyl groups may be used including, for example, reaction products of polyhydric alcohols, preferably dihydric alcohols to which trihydric alcohols may be added, and polybasic, preferably dibasic carboxylic acids. Instead of the free polycarboxylic acids, the corresponding polycarboxylic acid anhydrides or corresponding polycarboxylic acid esters of lower alcohols or mixtures thereof may be used for producing the polyesters. The polycarboxylic acids used may be aliphatic, cycloaliphatic, aromatic and/or heterocyclic and may be substituted, e.g. with halogen atoms, and/or unsaturated. The following are examples: succinic acid; adipic acid; suberic acid; azelzic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid which may be mixed with monomeric fatty acids; dimethylterephthalate and diethylene terephthalate. Suitable polyhydric alcohols are e.g. ethylene glycol; propylene-1,2-glycol; propylene-1,3-glycol; butylene-1,4-glycol, butylene-2,3-glycol; hexane-1,6-diol; octane-1,8-diol; neopentylglycol; cyclohexane dimethanol (1,4-bis-hydroxymethylcyclohexane); 2-methyl-propane-1,3-diol; glycerol; trimethylolpropane; hexane-1,2,6-triol; butane-1,2,4-triol, trimethylolethane; pentaerythritol; quinitol; mannitol; sorbitol; methyl glycoside; diethylene glycol; triethylene glycol; tetraethylene glycol; polyethylene glycols; dipropylene glycol; polypropylene glycols; dibutylene glycol and polybutylene glycols. The polyesters may also contain some carboxyl end groups. Any suitable polyester of a lactone such as ε-caprolactone or hydroxycarboxylic acids such as ω-hydroxycaproic acid may also be used.

The polyethers used according to the invention which contain at least 2, generally 2 to 8 and preferably 2 or 3 hydroxyl groups are also known per se and are prepared, for example, by the polymerization of epoxides such as ethylene oxide; propylene oxide; butylene oxide; tetrahydrofuran; styrene or epichlorohydrin, each with itself, e.g. in the presence of boron trifluoride or by the addition of these epoxides, either as mixtures or successively, to starting components which contain reactive hydrogen atoms such as alcohols or amines, e.g. water, ethylene glycol, propylene-1,3-glycol, propylene-1,2-glycol, trimethylolpropane, 4,4'-dihydroxydiphenylpropane, aniline, ammonia, ethanolamine or ethylene diamine. Sucrose polyethers such as those described, for example, in German Auslegeschriften No. 1,176,358 and 1,064,938 may also be used according to the invention. It is in many cases preferred to use polyethers which contain predominantly primary hydroxyl groups (up to 90% by weight, based on all the hydroxyl groups present in the polyether). Polyethers which are modified with vinyl polymers are also suitable, e.g. those obtained by the polymerization of styrene or acrylonitrile in the presence of polyethers (U.S. Pat. Nos. 3,383,351; 3,304,273; 3,523,093 and 3,110,695 and German Patent Specification No. 1,152,536), as well as polybutadienes which contain hydroxyl groups.

Any suitable polythioether may be used including the condensation products of thiodiglycol with itself and/or with other glycols; dicarboxylic acids; formaldehyde; aminocarboxylic acids or aminoalcohols. The products obtained are polythio mixed ethers; polythioether esters or polythioether ester amides, depending on the cocomponents.

Any suitable polyacetal including, for example, the compounds which can be prepared from glycols such as diethylene glycol; triethylene glycol; 4,4'-dioxethoxydiphenyl-dimethylmethane; hexane diol and formaldehyde may be used. Polyacetals suitable for the purpose of the invention may also be prepared by the polymerization of cyclic acetals.

Any suitable polycarbonate having hydroxyl groups may be used. Such polycarbonates are also known per se, for example those obtained by reacting diols such as propane-1,3-diol; butane-1,4-diol and/or hexane-1,6-diol or diethylene glycol; triethylene glycol or tetraethylene glycol with diarylcarbonates, e.g. with diphenylcarbonate or phosgene.

Any suitable polyester amide or polyamide may be used including e.g. the predominately linear condensates which can be obtained from polyvalent saturated and unsaturated carboxylic acids or their anhydrides and polyvalent saturated and unsaturated amino alcohols, diamines, polyamines and mixtures thereof.

Polyhydroxyl compounds which already contain urethane or urea groups and modified or unmodified natural polyols such as castor oil, carbohydrates or starch may also be used. Addition products of alkylene oxides and phenolformaldehyde resins or urea-formaldehyde resins are also suitable for the process according to the invention.

Representatives of these organic compounds having reactive hydrogens which may be used according to the invention have been described e.g. in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff -Handbuch, Volume VII, Vieweg-Hochtlen, Carl-HanserVerlag, Munich, 1966, e.g. on pages 45–71, the disclosures of which are incorporated herein by reference.

For producing the semi-rigid elastomeric foams with a dense outer skin which are of special interest in this invention, it is particularly preferred to use difunctional polyhydroxyl compounds of the type mentioned above, optionally mixed with up to 10 hydroxyl equivalent percent, based on the total mixture of polyhydroxyl compounds, of the higher functional and in particular trifunctional polyhydroxyl compounds.

In the process according to the invention, the reactants (including water which may be used as blowing agent) are used in proportions which correspond to an isocyanate ratio of 70 to 160 (an isocyanate ratio of 100 means that the reaction mixture contains equivalent quantities of isocyanate groups and active hydrogen atoms which enter into reaction with these isocyanate groups). For producing the semi-rigid elastomeric foams with dense outer skin which are of special interest in this invention, the isocyanate ratio is generally between 90 and 110.

Any suitable blowing agent may be used. In many cases, water and/or readily volatile organic substances are used as blowing agents. Suitable organic blowing agents are e.g. acetone; ethyl acetate; methanol; ethanol; halogenated alkanes such as methylene chloride; chloroform; ethylidene chloride; vinylidene chloride; monofluorotrichloromethane; chlorodifluoromethane or dichlorodifluoromethane or butane; hexane; heptane or diethylether. Compounds which decompose at temperatures above room temperature with the liberation of gases, e.g. of nitrogen, for example azo compounds such as azoisobutyric acid nitrile, may also act as blowing agents. Other examples of blowing agents and details concerning the use of blowing agents may be found in Kunststoff Handbuch, Volume VII, published by Vieweg and Hochtlen, Carl-Hanser-Verlag, Munich 1966, e.g. on pages 108 and 109, 453 to 455 and 507 to 510 the disclosure of which is incorporated herein by reference.

Catalysts are often used in the process according to the invention. Any suitable catalyst may be used in a catalytic amount such as e.g. tertiary amines such as triethylamine, tributylamine, N-methyl-morpholine, N-ethyl-morpholine; N-cocomorpholine; N,N,N′, N′-tetramethyl-ethylene diamine; 1,4-diaza-bicyclo-(2,2,2)-octane; N-methyl-N′-dimethylaminoethylpiperazine; N,N-dimethylbenzylamine; bis-(N,N-diethylaminoethyl) -adipate; N,N-diethylbenzylamine; pentamethyl-diethylenetriamine; N,N-dimethylcyclohexylamine; N,N,N′,N′-tetramethyl-1, 3-butanediamine; N,N-dimethyl-β-phenylethylamine, 1,2-dimethylimidazole, 2-methylimidazole or the like.

Suitable tertiary amines catalysts which contain hydrogen atoms which are reactive with isocyanate groups include e.g. triethanolamine; triisopropanolamine; N-methyldiethanolamine; N-ethyl-diethanolamine; N,N-dimethyl-ethanolamine; and their reaction products with alkylene oxides such as propylene oxide and/or ethylene oxide.

Silaamines which contain carbon-silicon bonds may also be used as catalyst, e.g. those described in German Patent Specification No. 1,229,290 such as 2,2,4-trimethyl-2-silamorpholine and 1,3-diethylaminomethyl-tetramethyldisiloxane.

Bases which contain nitrogen such as tetraalkylammonium hydroxides; alkali metal hydroxides such as sodium hydroxide; alkali metal phenolate such as sodium phenolate and alkali metal alcoholates such as sodium methylate are also suitable catalysts. Hexahydrotriazines may also be used.

Organic metal compounds may also be used as catalysts according to the invention, in particular organic tin compounds.

The organic tin compounds used are preferably tin (II) salts of carboxylic acids such as tin (II) acetate; tin (II) octoate; tin (II) ethylhexoate and tin (II) laurate and the dialkyl tin salts of carboxylic acids such as dibutyl tin diacetate, dibutyl tin dilaurate, dibutyl tin maleate, dioctyl tin diacetate or the like.

Other examples of catalysts which may be used according to the invention and the action of the catalysts have been described in Kunststoff-Handbuch, Volume VII, published by Vieweg and Hochtlen, Carl-Hanser-Verlag, Munich 1966, e.g. on pages 96 to 102, the disclosure of which is incorporated herein by reference.

The catalysts may be used in any catalytic amount, usually in a quantity of between about 0.001% and 10% by weight, based on the weight of compounds having a molecular weight of about 62 to about 10,000 which contain at least two hydrogen atoms which are reactive with isocyanates.

Conventional surface active additives (emulsifiers and foam stabilizers) may also be used in the process according to the invention. Suitable emulsifiers include e.g. the sodium salts of ricinoleic sulphonates or of fatty acids or salts of fatty acids with amines such as oleic acid diethylamine or stearic acid diethanolamine. Alkali metal or ammonium salts of sulphonic acids such as dodecylbenzene sulphonic acid or dinaphthylmethane disulphonic acid or of fatty acids such as ricinoleic acid or of polymeric fatty acids may also be used as surface active additives.

Conventional foam stabilizers may be used such as water-soluble polyether siloxanes. These compounds generally have a polydimethylsiloxane group attached to a copolymer of ethylene oxide and propylene oxide. Foam stabilizers of this kind have been described e.g. in U.S. Pat. No. 3,629,308, the disclosure of which is incorporated herein by reference.

Reaction retarders, e.g. substances which are acid in reaction such as hydrochloric acid or organic acid halides, cell regulators known per se such as paraffins or fatty alcohols or dimethyl polysiloxanes, pigments, dyes and flame retarding agents known per se such as tris-chloroethyl phosphate or ammonium phosphate and polyphosphate, stabilizers against ageing and weathering, plasticizers, fungistatic and bacteriostatic substances and fillers such as barium sulphate, kieselguhr, carbon black or whiting may also be used according to the invention.

Further examples of surface active additives; foam stabilizers; cell regulators; reaction retarders; stabilizers; flame retarding substances; plasticizers; dyes; fillers and fungistatic and bacterostatic substances which may also be used according to the invention and details of the action and method of using these additives may be found in Kunststoff-Handbuch, Volume VI, published by Vieweg and Hochtlen, Carl-Hanser-Verlag, Munich 1966, e.g. on pages 103 to 113, the disclosure of which is incorporated herein by reference.

In the process according to the invention, the foaming is carried out in a suitable mold. The reaction mixture is introduced into a mold made of a metal, e.g. aluminum or a plastics material, e.g. an epoxide resin. The reaction mixture foams up inside the mold to form the molded product. This process of foaming in the mold may be carried out to produce a molded product with a cellular structure on its surface or it may be carried out to produce a molded product with a compact skin and cellular core. According to the invention, these two types of structure can be obtained by either introducing just sufficient foamable reaction mixture into the mold to fill the mold with foam or introducing a larger quantity of foamable reaction mixture, in which case foaming is said to be carried out under conditions of overcharging. This method of procedure has been disclosed, e.g. in U.S. Pat. Nos. 3,178,490 and 3,182,104, disclosures of which are incorporated herein by reference.

Cold setting foams may also be produced according to the invention (see British Pat. Specification No. 1,162,517 and German Offenlegungsschrift No. 2,153,086).

In the process of foaming in the mold, the known mold release agents may also be used in addition.

According to the invention, esters of ricinoleic acid and long chain fatty acids are used as mold release agents. Preferably, 0.8 to 4 mol, and most preferably 0.9 to 2 mol of ricinoleic acid is used per mol of long chain fatty acid.

The long chain fatty acids used are preferably acids with more than 8 carbon atoms and in particular, 12 to 20 carbon atoms and which are substantially free of alcoholic hydroxyl groups. Although natural or synthetic dicarboxylic and polycarboxylic acids may also be used, it has been found most suitable to use natural monocarboxylic acids or natural fatty acid mixtures, e.g. abietic acid, palmitic acid, stearic acid, oleic acid, elaidic acid, linoleic acid, linolenic acid or fatty acid mixtures obtained from commercial processes, such as sperm oil fatty acid, train oil fatty acid, tallow fatty acid, soya oil fatty acid, palm kernel fatty acid, ground nut fatty acid, tall oil fatty acid, and the like. The fatty acids or fatty acid mixtures used are preferably liquid at room temperature, in particular oleic acid and/or commercial fatty acid mixtures which contain mainly oleic acid, for example soya oil fatty acid or tall oil fatty acid.

Preparation of the esters of ricinoleic acid and long chain fatty acids which are to be used in the process according to the invention may be carried out by various methods known in the art for producing esters. A simple method which has proved to be particularly suitable comprises heating a mixture of about 1 to 4 mols of ricinoleic acid with 1 mol (or an average of 1 mol determined by calculation) of the long chain fatty acid to temperatures of up to 220° C, preferably up to 170° C, at reduced pressure, for example in the vacuum produced by a water jet pump, and drawing off the water liberated in the reaction. The osmotically determined molecular weights of the resulting esters are between about 500 and about 1800. The esterification product which may be used directly as a mold release agent may quite well still contain a certain amount of products of side reactions in addition to unreacted starting materials. The esterification reaction may accordingly also be carried out with molar ratios outside the limits indicated above, i.e. with less or more than 1 mol of long chain fatty acid and more or less than about 0.8 to 4 mols of ricinoleic acid per mol of long chain fatty acid. The most satisfactory results, however, are obtained within the molar ratios given above.

Exceptionally good results are obtained when the reaction is carried out with exclusion of air, e.g. in an nitrogen or carbon dioxide atmosphere.

The reaction products used as mold release agents according to the invention may be added as such to the starting components used for producing the foam, e.g. to the polyol, to the polyisocyanate, or to the foamable reaction mixture as a third stream. The mold release agents according to the invention may be added to the starting components at room temperature or they may be added at elevated temperatures, for example to the polyisocyanates, so that they undergo a preliminary reaction with the isocyanate by the so-called prepolymer process. The new mold release agents are used in proportions of 0.3 to 30% by weight, preferably 1 to 10% by weight, based on the total quantity of reaction mixture.

The mold release agents to be used according to the invention are suitable in principle for improving the removal from the mold of any polyurethane foams, i.e. both soft, semi-rigid and rigid foams known per se but it was found particularly advantageous to use them according to the invention for producing the semi-rigid polyurethane foams with compact outer skin known per se by the process of foaming in the mold.

The foam formulations may, of course, also contain other mold release agents or mold release systems, for, example those described in German Offenlegungsschriften No. 1,953,637 and 2,121,670 or in Belgian Patent Speicifaction No. 782,942, e.g. the oleic acid salt or tall oil fatty acid salt of the amine which contains amide groups obtained by reacting N-dimethylaminopropylamine with oleic acid or tall oil fatty acid.

Mold release agents of the kind described in German Patent Applications P 23 06 276.2 and P 23 56 692.9 which are introduced into the foam by way of modified isocyanates may also be used as additional mold release agents.

According to the invention, the starting materials may be reacted together by the known one-step, prepolymer or semi-prepolymer process, often using mechanical devices such as those described e.g. in U.S. Pat. Reissue No. 24,514. Details about processing apparatus which may be used in the process according to the invention are given in Kunststoff-Handbuch, Volume VI, published by Vieweg and Hochtlen, Karl-Hanser-Verlag, Munich 1966, e.g. on pages 121 to 205.

Rigid foam products obtained by the process may be used for the manufacture of furniture parts, parts of car bodies, technical apparatus and building elements while semi-rigid to elastic foam products may be used for producing safety cushioning in motor vehicles, elastic shoe soles, bumpers, etc.

The process according to the invention will now be described by way of example. The parts given are parts by weight unless otherwise indicated.

EXAMPLES

Preparation of the reaction products of ricinoleic acid and long chain fatty acids which are to be used as mold release agents:

A:

Equal parts by weight of ricinoleic acid and oleic acid are mixed with stirring under a layer of nitrogen and then heated to 150° C at a water column pressure of about 18 mm for 15 hours, and the volatile constituents liberated are removed at the same time by means of a distillation bridge.

The molecular weight determined osmotically in toluene is found to be 680.

B:

The procedure is the same as described under A) but 2 parts of ricinoleic acid and 1 part of oleic acid are used and esterification is carried out for 20 hours. The molecular weight found is 930.

C:

The procedure is the same as under A) but a commercial tall oil fatty acid mixture is used instead of oleic acid. The molecular weight is found to be 701.

D:

The procedure is the same as described under B) but instead of oleic acid, a commercial mixture of soya oil fatty acid is used. The molecular weight is found to be 1020.

EXAMPLE 1

100 Parts by weight of a polyol mixture with a hydroxyl number of 276 and a viscosity of 730 cP at 25° C. consisting of 90 parts by weight of a poly (alkylene ether) glycol with a hydroxyl number of 28 which has been obtained by the addition of a mixture of 80% of propylene oxide and 20% of ethylene oxide to propylene glycol, 22 Parts by weight of butane-1,4-diol,
2 Part by weight of ethylene glycol,
0.1 Part by weight of water,
0.8 Part by weight of triethylene diamine,
0.08 Part by weight of dibutyl tin-IV-dilaurate,
4 Parts by weight of monofluorotrichloromethane,
2 Parts by weight of methylene chloride,
6 Parts by weight of "internal mold release agent" according to Example A,
54 Parts by weight of polyisocyanate based on diphenylmethane-4,4'-diisocyanate which has an isocyanate content of 30.3% and which has been liquefied by a uretone-imine content of 15% and which has been obtained by mixing at about 80° C about 1000 parts (4 mols) of 4,4'-diphenylmethane diisocyanate with about 2.5 mol % of urea and heating the resulting mixture at about 225° C until said NCO-content has been reached.

18 Parts by weight of a reaction product of 70 parts by weight of the polyisocyanate described above and 30 parts by weight of polydimethylsiloxane with methylol end groups and a hydroxyl number of 198, which reaction product has an isocyanate content of 16.5%

The polyol mixture and mold release agent are mixed with the isocyanate mixture by means of a two-component feeding and mixing apparatus and the whole mixture is introduced into a closed, tempered steel mold which is at a temperature of 60° C. The plastics mixture begins to foam up after 12 seconds and sets after a further 12 seconds.

The steel mold can easily be opened after 3 minutes and the semi-rigid molded product can be removed without adhering to the mold.

The molded product has an overall gross density of 0.80 g/cm³ and a material thickness of 10 mm with a compact marginal zone which means a dense skin on both sides.

EXAMPLE 2

100 Parts by weight of a polyol mixture with a hydroxyl number of 276 and a viscosity of 730 cP at 25° C. consisting of 90 Parts by weight of a poly (alkylene ether) glycol with a hydroxyl number of 28 which has been obtained by the addition of a mixture of 80% propylene oxide and 20% of ethylene oxide to propylene glycol, 22 Parts by weight of butane-1,4-diol,
1 Part by weight of ethylene glycol,
0.1 Part by weight of water,
0.8 Part by weight of triethylene diamine,
0.08 Part by weight of dibutyl tin-IV-dilaurate,
4 Parts by weight of monofluorotrichloromethane,
2 Parts by weight of methylene chloride,
6 Parts by weight of "internal mold release agent", according to Example B and Parts by weight of a polyisocyanate based on diphenylmethane-4,4'-diisocyanate as described in Example 1.

18 Parts by weight of a reaction product of 70 parts by weight of the polyisocyanate described above and 30 parts by weight of a polymethylsiloxane with primary hydroxyl end groups and a hydroxyl number of 198, which reaction product has an isocyanate content of 16.5%.

The polyol and blowing agent are mixed with the isocyanate mixture by means of a two-component feeding and mixing apparatus and the whole mixture is introduced into a closed, tempered steel mold which is at a temperature of 60° C.

The plastics mixture begins to foam after 10 seconds and sets after a further 8 seconds.

The steel mold can easily be opened after 3 minutes and the semi-rigid molded product can be removed without any part of it adhering to the mold.

The molded product has an overall gross density of 0.80 g/cm³ and a material thickness of 10 mm with a compact marginal zone on both sides.

EXAMPLE 3

100 Parts by weight of a polyol mixture with a hydroxyl number of 276 and a viscosity of 730 cP at 25° C. consisting of 90 Parts by weight of a poly (alkylene ether) glycol with a hydroxyl number of 28 which has been obtained by the addition of a mixture of 80% of propylene oxide and 20% of ethylene oxide to propylene glycol, 22 Parts by weight of butane-1,4-diol,
1 Part by weight of ethylene glycol,
0.1 Part by weight of water,
0.8 Part by weight of triethylenediamine
0.08 Part by weight of dibutyl tin-IV-dilaurate,
4 Parts by weight of monofluorotrichloromethane,
2 Parts by weight of methylene chloride,
6 Parts by weight of "internal mold release agent" according to Example C;
64.5 Parts by weight of a polyisocyanate based on diphenylmethane-4,4'-diisocyanate which has been described in Example 1.

The polyol mixture and blowing agent are mixed with the isocyanate by means of a two-component feeding and mixing apparatus and the whole mixture is introduced into a closed, tempered aluminum mold which is at a temperature of 60° C.

The plastics mixture begins to foam after 8 seconds and sets after a further 7 seconds.

The semi-rigid molded product can be removed from the mold after 3 minutes without adhering to it.

It has an overall gross density of 0.80 g/cm³ and a material thickness of 10 mm with a compact marginal zone on both sides.

EXAMPLE 4

100 Parts by weight of a polyol mixture with a hydroxyl number of 550 and a viscosity of 1650 cP at 25° C. consisting of 60 parts by weight of a poly (alkylene ether) polyol with a hydroxyl number of 830 which has been obtained by the addition of propylene oxide to trimethylolpropane, and 40 Parts by weight of a poly (alkylene ether) polyol with a hydroxyl number of 42, which has been obtained by the addition of a mixture of propylene oxide and ethylene oxide to a mixture of trimethylolpropane and propylene glycol (molar ratio 3:1),
1 Part by weight of a foam stabilizer as disclosed in U.S. Pat. No. 3,629,308, column 12, lines -13,
0.6 Part by weight of tetramethylguanidine as catalyst,
3 Parts by weight of dimethyl-benzylamine as catalyst.
12 Parts by weight of monofluorotrichloromethane,
3 Parts by weight of an amidiamine oleic acid salt (prepared from 1 mol of 3-dimethylaminopropylamine-1 and 2 mols of oleic acid),
6 Parts by weight of "internal mold release agent" according to Example A and
145 Parts by weight of a polyisocyanate which has been prepared by phosgenating aniline-formaldehyde condensates and which has a viscosity of 120 cP at 25° C. and an NCO content of 31.5%, which viscosity and NCO content has been reached by distilling off dinuclear diisocyanate from the phosgenation products.

The polyol mixture and blowing agent are mixed with the isocyanate by means of a two-component feeding and mixing apparatus and introduced into a closed, aluminum mold which is at a temperature of 60° C.

The plastics mixture begins to foam after 22 seconds and sets after a further 18 seconds.

The hard molded product can be removed from the aluminum mold after 5 minutes. It lies loosely in the mold without adhering to it at any point.

It has an overall gross density of 0.50 g/cm$^3$ and a material thickness of 10 mm with a compact marginal zone on both sides.

EXAMPLE 5

100 Parts by weight of a polyol mixture with a hydroxyl number of 276 and a viscosity of 730 cP at 25° C. consisting of 90 Parts by weight of a poly (alkylene ether) glycol with a hydroxyl number of 28 which has been obtained by the addition of a mixture of 80% of propylene oxide and 20% of ethylene oxide to propylene glycol, and
22 Parts by weight of butane-1,4-diol,
1 Part by weight of ethylene glycol,
0.1 Part by weight of water,
0.8 Part by weight of triethylenediamine
0.08 Part by weight of dibutyl tin-IV-dilaurate,
4 Parts by weight of monofluorotrichloromethane,
2 Parts by weight of methylene chloride,
6 Parts by weight of "internal mold release agent" according to Example D
64 parts by weight of a semiprepolymer which has been obtained by reacting 5 mols of diphenylmethane-4,4'-diisocyanate with 1 mol of tripropylene glycol and which has an isocyanate content of 27%, and
21 Parts by weight of a reaction product of 70 parts by weight of a polyisocyanate based on diphenylmethane-4,4'-diisocyanate which is liquefied by its uretoneimine content of 15% and 30 parts by weight of a polymethylsiloxane with primary hydroxyl end groups and a hydroxyl number of 198, which reaction product has an isocyanate content of 16.5%.

The polyol mixture and blowing agent are mixed with the isocyanate mixture by means of a two-component feeding and mixing apparatus and the whole mixture is introduced into a closed, tempered steel mold which is at a temperature of 60° C.

The plastics mixture begins to foam up after 14 seconds and sets after a further 10 seconds.

The steel mold can easily be opened after 3 minutes and the semi-rigid molded product can be removed from the mold without adhering to it to any significant extent.

The molded product has an overall gross density of 0.80 g/cm$^3$ and a material thickness of 10 mm with a compact marginal zone on both sides.

EXAMPLE 6

100 Parts by weight of a polyol mixture with a hydroxyl number of 276 and a viscosity of 730 cP at 25° C. consisting of 90 parts by weight of a poly (alkylene ether) glycol with a hydroxyl number of 28 which has been obtained by the addition of a mixture of 80% propylene oxide and 20% of ethylene oxide to propylene glycol,
22 Parts by weight of butane-1,4-diol,
1 Part by weight of ethylene glycol,
0.1 Part by weight of water,
0.8 Part by weight of triethylene diamine,
0.08 Part by weight of dibutyl tin-IV-dilaurate,
4 Parts by weight of monofluorotrichloromethane,
2 Parts by weight of methylene chloride,
6 Parts by weight of "internal mold release agent" according to Example A,
54 Parts by weight of a polyisocyanate based on diphenylmethane-4,4'-diisocyanate which has been described in Example 1, and
18 Parts by weight of a reaction product (stirred together for 3 hours at 100° C) of 70 parts by weight of the polyisocyanate described above and 30 parts by weight of the "internal mold release agent" according to Example A, which reaction product has an NCO content of 16.8%.

The polyol mixture and blowing agent are mixed with the isocyanate mixture in a two-component feeding and mixing apparatus and the whole mixture is introduced into a closed, tempered steel mold which is at a temperature of 60° C.

The plastics mixture begins to foam up after 10 seconds and sets after a further 11 seconds.

The steel mold can easily be opened after 3 minutes and the semi-rigid molded product can be removed without adhering to it.

The molded product has an overall gross density of 0.80 g/cm$^3$ and a material thickness of 10 mm with a compact marginal zone on both sides.

Any of the other mold release agents provided by the invention may be substituted for those used in the foregoing examples. As is apparent from the disclosure, this invention contemplates broadly the foaming of all foamable compositions which produce polyurethane foams and is not concerned with the provision of any new organic polyisocyanates, polyols or other conventional components of such a foamable reaction mixture. The invention, on the other hand, provides a new mold release compound for those heretofore known moldable foamable mixtures.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for producing a foam plastic which readily separates from the mold in which it has been foamed wherein a foamable reaction mixture containing an organic polyisocyanate, an organic compound having a molecular weight of about 62 to about 10,000 which contains reactive hydrogen atoms, a catalyst for the acceleration of the isocyanate/reaction hydrogen reaction, and a blowing agent is charged to the mold and reacted, the improvement which comprises adding to said active hydrogen containing component or to the foamable reaction mixture as a third stream an esterification reaction product of about 0.8 mol to about 4 mols of ricinoleic acid and 1 mol of a long chain fatty acid containing more than 8 carbon atoms which is substantially free of alcoholic hydroxyl groups, in an amount sufficient to improve the mold release properties of the resulting molded product.

2. The process of claim 1, wherein the long chain fatty acid is oleic acid or a mixture of fatty acids which contains oleic acid.

3. The method of claim 1 wherein the fatty acid has at least 8 carbon atoms.

4. The process of claim 1 wherein a surfactant is included.

5. The process of claim 1 wherein a tertiary amine, a tin catalyst and siloxane-polyalkylene copolymer surfactant are included.

6. The process of claim 5 wherein the tertiary amine is triethylene diamine and the tin catalyst is a tetravalent tin compound.

* * * * *